United States Patent
Mori

(10) Patent No.: US 6,911,804 B2
(45) Date of Patent: Jun. 28, 2005

(54) MOBILE INFORMATION APPARATUS, METHOD AND PROGRAM FOR OPTIMIZING THE CHARGE STATE OF THE APPARATUS, AND BATTERY MANAGEMENT SERVER, METHOD AND PROGRAM USING THE SERVER TO OPTIMIZE THE CHARGE STATE OF BATTERY-POWERED ELECTRICAL APPARATUS

(75) Inventor: Iichiro Mori, Itami (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 35 days.

(21) Appl. No.: 10/650,405

(22) Filed: Aug. 28, 2003

(65) Prior Publication Data

US 2004/0066171 A1 Apr. 8, 2004

(30) Foreign Application Priority Data

Aug. 30, 2002 (JP) ...................................... 2002-254888

(51) Int. Cl.[7] ................................................. H02J 7/00
(52) U.S. Cl. ..................................................... 320/132
(58) Field of Search ................................. 320/132, 130, 320/136, DIG. 21; 324/426, 427; 702/63, 64

(56) References Cited

U.S. PATENT DOCUMENTS 6,646,419 B1 * 11/2003 Ying .......................... 320/132
6,664,764 B1 * 12/2003 Odaohhara ................. 320/132

FOREIGN PATENT DOCUMENTS

| JP | 2001327092 A | 11/2001 |
|----|--------------|---------|
| JP | 2002051478 A | 2/2002  |
| JP | 2002078222 A | 3/2002  |

* cited by examiner

Primary Examiner—Pia Tibbits
(74) Attorney, Agent, or Firm—Akin Gump Strauss Hauer & Feld, L.L.P.

(57) ABSTRACT

A schedule recording section (4) records a user's schedule. A SOC (state-of-charge) optimization planning section (5) plans the SOC of a rechargeable battery (21) based on the user's schedule. The planned control target SOC is optimized through a comparison between the continuous charging characteristic of the rechargeable battery (21) and the length of an operable period or the amount of electric power to be secured at the time of battery-powered operation. For example, a control target SOC is set at a full charge in the proximity of the period during which a battery-powered operation time is expected to be long. A control target SOC is set lower enough than a full charge in the period during which a connection to an external power supply (A) by the AC adapter (11) is expected to continue for a long time. A power-supply control section (3) controls the charge and discharge of the rechargeable battery (21) according to a plan for the optimization of the SOC.

6 Claims, 6 Drawing Sheets

MOBILE INFORMATION APPARATUS, METHOD AND PROGRAM FOR OPTIMIZING THE CHARGE STATE OF THE APPARATUS, AND BATTERY MANAGEMENT SERVER, METHOD AND PROGRAM USING THE SERVER TO OPTIMIZE THE CHARGE STATE OF BATTERY-POWERED ELECTRICAL APPARATUS

BACKGROUND OF THE INVENTION

The present invention is related to a mobile information apparatus such as a notebook computer, a personal digital assistant (PDA), a cellular phone, a digital still-video camera (DSC) and a digital video camera (DVC), or a portable AV apparatus. The present invention is related particularly to a method for optimizing the charge state (which is also referred to as the SOC) of the rechargeable battery built into the mobile information apparatus.

The present invention is further related to a server that can carry out data communications with battery-powered electrical apparatuses on a network. The present invention is related particularly to a method using the server to optimize the charge state of the rechargeable battery built in each of the battery-powered electrical apparatuses on the network. Here, battery-powered electrical apparatuses include, for example, power tools such as a power drill, a power saw, and a power mower; household electric appliances such as a flashlight, a cordless cleaner, a cordless iron, an electric razor, and an electric toothbrush; emergency appliances such as a fire alarm, an emergency light, a burglar alarm, and an uninterruptible power source (UPS); in addition to the above-described mobile information apparatuses.

Most of the battery-powered electrical apparatuses have the charger. A user connects those battery-powered electrical apparatuses to the commercial AC power supply when not in use, thereby being capable of charging built-in rechargeable batteries without taking them out. Thus, the user can smoothly use those battery-powered electrical apparatuses without any trouble about mating and demating of the rechargeable battery.

Conventional battery-powered electrical apparatuses charge the rechargeable batteries usually until fully charged. Here, a fully charged condition is defined as a condition of a rechargeable battery charged to the substantial maximum capacity. The conventional battery-powered electrical apparatuses further maintain the rechargeable batteries in the fully charged condition by compensation for the self-discharge of the batteries with a continuous charge. Thus, at the time of the next battery-powered operation, the operable time or the available electric power is set at the maximum in substantially all cases.

However, a rechargeable battery generally deteriorates when maintained in the fully charged condition for a long time by a continuous charge. In other words, the upper limit of the battery capacity reduces. The degree of the deterioration, that is, the reduction tendency of the upper limit of the battery capacity (which is hereafter referred to as the continuous charging characteristic) varies among types of rechargeable battery. For example, a nickel-cadmium (NiCd) storage battery keeps a long life under the continuous charge. As for a lithium ion (Li-ion) rechargeable battery, when maintained in the fully charged condition, a number of lithium atoms are continuously concentrated into the graphite layer at the negative electrode and damage the graphite layer. As a result, the Li-ion rechargeable battery deteriorates by the continuous charge. The deterioration is particularly severe under high temperature conditions. When a notebook computer is driven with a commercial AC power supply, for example, the built-in rechargeable batteries are continuously charged under the conditions where the CPU and others generate an intense heat. The life is remarkably shortened when the rechargeable batteries are a lithium rechargeable battery. Accordingly, it is generally undesirable to maintain rechargeable batteries in the fully charged condition across the board, independently of the types and the use conditions of the battery-powered electrical apparatuses.

Conventional battery-powered electrical apparatuses include one that can maintain the charge state of the rechargeable battery at the full charge or lower levels. One example is disclosed in Published Japanese patent application No. 2001-327092 gazette. A notebook computer disclosed in the gazette monitors the remaining capacity of the built-in rechargeable battery. A charge operation is started when the remaining capacity falls below a predetermined lower limit. On the other hand, a charge operation is finished or a discharge operation is started when the remaining capacity exceeds a predetermined upper limit. Thereby, the charge state of the rechargeable battery is maintained within the range between the upper and lower limits. Here, the upper and lower limits of the remaining capacity are changed in response to the charge mode chosen by a user. When a usual charge mode (the normal mode) is chosen, for example, the upper limit of the remaining capacity is assumed to be the battery capacity under the fully charged condition, and the lower limit is set at 95% of the battery capacity under the fully charged condition. When a charge mode (the preservation mode) is chosen in order to keep the rechargeable battery in a non-use state for a long time, the upper and lower limits of the remaining capacity are set at 80% and 50% of the battery capacity, respectively.

Other examples are disclosed in Published Japanese patent application No. 2002-51478 and No. 2002-78222 gazettes. Both of the battery-powered electrical apparatuses disclosed in those gazettes use Li-ion rechargeable batteries, and perform a constant voltage and constant current charge operation to the Li-ion rechargeable batteries. In the constant voltage and constant current charge operation, first, the amount of the charging current is maintained at a predetermined value by a constant current control. The battery voltage rises in the period of the constant current control. When the charge process proceeds and then the battery voltage reaches a predetermined value (which is hereafter referred to as a control changeover voltage), the constant current control is changed to a constant voltage control, and the charge voltage is maintained. The charging current gradually reduces in the period of the constant voltage control. When the charging current falls below a predetermined threshold value (which is hereafter referred to as a charging end current), the charge operation is broken off. The battery-powered electrical apparatuses disclosed in Published Japanese patent applications No. 2002-51478 and No. 2002-78222 gazettes can reduce the control changeover voltage and/or increase the charge end current, thereby allowing a sufficiency rate of charging of the rechargeable battery, that is, the charge state of the rechargeable battery at the end of the charging to reduce from the full charge.

For the battery-powered electrical apparatus according to the above examples, a user chooses a charge mode or a sufficiency rate of charging appropriate to the use conditions. For example, at the time of the drive with the commercial AC power supply, the user usually chooses the preservation mode or lowers the sufficiency rate from its maximum value. Thereby, the charge state of the rechargeable battery is maintained lower than the full charge, and then the deterioration of the rechargeable battery is suppressed. On the other hand, when a battery-powered operation is scheduled near at hand, the user chooses the normal mode or raises the sufficiency rate to its maximum value. Thereby, the rechargeable battery is fully charged, and then, the operable time or the available electric power at the next battery-powered operation is set substantially at the maximum. Thus, the battery-powered electrical apparatuses according to the above examples can maintain the life of the rechargeable battery long enough and maximize the utilization of the battery capacity.

For the conventional battery-powered electrical apparatus according to the above examples, the user has to judge the changeover timing of the charge mode and the set value and change timing of the sufficiency rate. In particular, the user has to optimize the charge state of the rechargeable battery in order to realize the maintenance of the long life of the rechargeable battery and the maximum use of the battery capacity at the same time. However, the optimum charge state of the rechargeable battery changes, depending on various factors such as the type of the rechargeable battery, the state of deterioration of the battery, the type of the battery-powered electrical apparatus, and the frequency of use of the apparatus under the battery-powered operation. Accordingly, it was difficult for the user to suitably judge the timing of changeover between the normal mode and the preservation mode, and the change timing and the set value of the sufficiency rate. In particular, when the single user uses a variety of the battery-powered electrical apparatuses, the user has to set the charge mode or the sufficiency rate for each of the apparatuses, and this is a great burden for the user.

SUMMARY OF THE INVENTION

An object of the present invention is to provide a battery-powered electrical apparatus and a method for optimizing the charge state of the apparatus that can reduce a burden on the user with respect to the optimization of the charge state of the rechargeable battery and achieve both of the maintenance of the long life of the rechargeable battery and the maximum use of the battery capacity.

Briefly stated the present invention comprises a mobile information apparatus including (A) a battery storage section including a rechargeable battery; (B) a power supply section for converting electric power provided by one of an external power supply and the rechargeable battery to direct current power, and charging the rechargeable battery with electric power provided by the external power supply; C) a schedule recording section for recording a user's schedule; (D) a charge-state optimization planning section for determining a plan for the optimization of the charge state of the rechargeable battery according to the schedule; and (E) a power-supply control section for establishing charge and discharge conditions based on the plan for the optimization, and, on the charge and discharge conditions, controlling the charge and discharge of the rechargeable battery by the power supply section.

Here, the mobile information apparatus includes, for example, a notebook computer, a PDA, a cellular phone, a DSC, a DVC, and a portable AV apparatus. The charge state (which is also referred to as the SOC) of the rechargeable battery is defined as the rate of the remaining capacity to the battery capacity under the fully charged condition. A plan for the optimization of the charge state of the rechargeable battery (which is hereafter referred to as an optimization plan) is defined as the plan for the setting of the charge state of control target, for example, a table showing the correspondence between the periods for which the settings are planned and the contents of the settings. The charge state of control target is defined as the charge state of the rechargeable battery to be maintained at the time of the connection of the above-mentioned mobile information apparatus to the external power supply, and it is expressed, for example, as a single value or a range. Alternatively, the charge state of control target may be expressed as a difference in charge modes, that is, whether a charging to the full charge or a charging to the charge state lower than the full charge.

The above-mentioned optimization plan is determined as follows. A mobile information apparatus is generally equipped with an application (which is hereafter referred to as a scheduler) to record a user's schedule. In the above-mentioned mobile information apparatus, the schedule recording section functions with the scheduler. The schedule recording section records data on the user's schedule with a predetermined file format. The charge-state optimization planning section first accesses to a file recorded about the user's schedule, and estimates the use schedule of the above-mentioned mobile information apparatus by the user. The use schedule includes, for example, the presence or absence of the connection to an external power supply, the frequency of battery-powered operation, the operating/standby time, the use objective, and the power consumption. For example, when a user stays at the office or home for a long time, the charge-state optimization planning section may estimate "In that period, the above-mentioned mobile information apparatus is connected to an external power supply (for example, a commercial AC power supply)." On the other hand, when a user frequently goes out or travels for a long time in such cases as a business trip, the charge-state optimization planning section may estimate "In that period, the frequency of the battery-powered operation is high, and a operating/standby time under the battery-powered operation is long." The charge-state optimization planning section further estimates the use objective of the above-mentioned mobile information apparatus (for example, the target application or function of launching) from a planned place of the user's stay or an action plan of the user, and then may roughly estimate the power consumption. The charge-state optimization planning section next determines the charge state of control target with respect to each of the periods wherein a connection of the mobile information apparatus to an external power supply is expected, according to the estimated schedule of use of the apparatus. Here, the charge state of control target is optimized, for example, through the comparison of the following two terms: The one is the reduction tendency of the battery capacity preserved under the continuous charge operations (which is hereafter referred to as the continuous charging characteristic). The other is the operable time or the electric power to be secured at the time of the next battery-powered operation. For example, when a long operating time or great power consumption is estimated at the next battery-powered operation, the charge state of control target may be set at the full charge. On the other hand, when a long connection time to an external power supply is estimated, the charge state of control target may be set at the level lower than the full charge, for the purpose of suppressing the deterioration due to the continuous charge operations. Thus, the above-mentioned optimization plan is determined.

The power-supply control section determines charge and discharge conditions based on the above-mentioned optimization plans. Here, the charge and discharge conditions are defined as the setting conditions of the parameters required of the control over the charging and discharging of the rechargeable battery. The power-supply control section compares the charge state of control target with the real charge state with respect to the rechargeable battery. The power-supply control section establishes a discharge condition when a discharging is required, and establishes a charge condition when a charging is required.

The discharging operation of a rechargeable battery is usually performed with the constant current control. The discharging current or the battery voltage is monitored in the constant current control. The charge state of control target is realized when the integrals of the discharging current (the amount of discharge electricity) increase to the target value or when the battery voltage falls to the target value (the discharge end voltage). Accordingly, the discharge condition stipulates, for example, the set value of the discharging current, the discharge duration, the discharge start/end time, the target value of the amount of discharge electricity, and the discharge end voltage.

The charging control of a rechargeable battery is generally performed with a different form in each type of rechargeable batteries. For example, a constant-current charge operation is performed for a NiCd storage battery or a nickel-hydrogen (NiH) storage battery. At that time, a charging current, a battery voltage, and/or a battery temperature are monitored. The charge state of control target is realized when the integrals of the charging current (the amount of charge electricity) increase to the target value or when the battery voltage or temperature rises to the target value (charge end voltage or temperature). Accordingly, the charge condition stipulates, for example, the set value of the charging current, the charge duration, the charge start/end time, the target value of the amount of charge electricity, and the charge end voltage and temperature.

A constant-voltage and constant-current charge operation is performed for the Li-ion rechargeable battery. In the constant-voltage and constant-current charge operation, first, the charging current is maintained constant and the battery voltage is monitored. When the battery voltage reaches the control changeover voltage, the charge voltage is maintained constant and the charging current is monitored. When the charging current declines to the charge end current, the charge state of control target is realized. Accordingly, the charge condition stipulates, for example, the set value of the charging current, the charge duration, the charge start/end time, the target value of the amount of charge electricity, the control changeover voltage, and the charge end current.

The power-supply control section controls the charge and discharge operations of the rechargeable battery by the power supply section according to the above-mentioned charge and discharge conditions, and realizes the charge state of control target. Thus, the charge state of the rechargeable battery is optimized, and thereby the maintenance of the long life of the rechargeable battery and the maximum use of the battery capacity are both achieved Then, the user has only to record the user's own schedule with the scheduler. Accordingly, the burden of the control over the charge state of the rechargeable battery is reduced.

A charge-state optimization program of the mobile information apparatus according to the present invention causes the CPU in the mobile information apparatus according to the above-mentioned present invention to function as the above-mentioned schedule recording, charge-state optimization planning, and power-supply control sections. Thereby, the program allows a general mobile information apparatus to function as the apparatus according to the present invention.

Another aspect of the invention is a method for optimizing the charge state of a battery in a mobile information apparatus. The method includes the steps of: (A) recording a user's schedule; (B) determining a plan for the optimization of the charge state of a rechargeable battery in a battery storage section according to the schedule; (C) establishing charge and discharge conditions based on the plan for the optimization; and (D) controlling the charge and discharge of the rechargeable battery by a power supply section on the charge and discharge conditions. Here, "the charge state of the rechargeable battery," "the optimization plan" related, and "the charge and discharge conditions" are defined in a manner similar to the definition in the above explanation of the mobile information apparatus according to the present invention.

The step of recording a user's schedule may be carried out, for example, using the scheduler incorporated into a general mobile information apparatus.

In the step of determining the above-mentioned optimization plan, first, the use schedule of the mobile information apparatus by the user is estimated based on the user's schedule recorded. The use schedule includes, for example, the presence or absence of the connection to an external power supply, the frequency of battery-powered operation, the operating/standby time, the use objective, and the power consumption. Next, the charge state of control target is determined for each period in which a connection of the mobile information apparatus to the external power supply is expected, according to the estimated schedule of use of the apparatus. Here, "the charge state of control target" is defined in a manner similar to the definition in the above explanation of the mobile information apparatus according to the present invention. The charge state of control target is optimized, for example, through the comparison between the continuous charging characteristic of the rechargeable battery and the operable time or the electric power to be secured at the time of the next battery-powered operation.

In the step of determining charge and discharge conditions, the charge state of control target is compared with the real charge state with respect to the rechargeable battery. Through the comparison, a discharge condition is established when the discharging is required, and a charge condition is established when the charging is required. The discharge condition stipulates, for example, the set value of the discharging current, the discharge duration, the discharge start/end time, the target value of the amount of discharge electricity, and the discharge end voltage. The charge condition stipulates, for example, the set value of the charging current, the charge duration, the charge start/end time, the target value of the amount of charge electricity, the charge end voltage/temperature, the control changeover voltage, and the charge end current.

In the step of controlling the charge and discharge of the rechargeable battery, the control is carried out according to the above-mentioned charge and discharge conditions, and the charge state of control target is realized.

Thus, the charge state of the rechargeable battery is optimized, and thereby the maintenance of the long life of the rechargeable battery and the maximum use of the battery capacity are both achieved. Then, the user has only to record the user's own schedule with the scheduler. Accordingly, the burden of the control over the charge state of the rechargeable battery is reduced.

A further aspect of the invention is a battery management server which serves as a server for providing a plan for an optimization of a charge state of a battery in a battery-powered electrical apparatus. The electrical apparatus includes:(a) a communications section for performing data communications with a network of the outside; (b) a battery storage section including a rechargeable battery; (c) a power supply section for converting electric power provided by one of an external power supply and the rechargeable battery to direct current power, and charging the rechargeable battery by the electric power provided by the external power supply; and (d) a power-supply control section for establishing charge and discharge conditions based on the plan for the optimization of the charge state of the rechargeable battery, and, on the charge and discharge conditions, controlling the charge and discharge of the rechargeable battery by the power supply section. The server includes: (A) a network interface for performing data communications with the network; (B) a schedule recording section for recording a user's schedule; (C) a device-list management section for monitoring a connection to the network by the battery-powered electrical apparatus, and creating and updating a list of the battery-powered electrical apparatuses connected to the network; and (D) a charge-state optimization planning section for determining the plan for the optimization about each of the battery-powered electrical apparatuses included in the list, and informing each of the battery-powered electrical apparatuses of the plan for the optimization. Here, "the charge state of the rechargeable battery," "the optimization plan" related, and "the charge and discharge conditions" are defined in a manner similar to the definition in the above explanation of the mobile information apparatus.

The above-mentioned network is, for example, an IP network, and preferably the network in conformity with IEEE802.3. The network may be, alternatively, the network based on the wireless LAN (IEEE802.11), the USB, or the IEEE1394. The network may be further the network using power lines according to the power line communications technology (PLC). At that time, the communications section in the above-mentioned battery-powered electrical apparatus performs data communications with the networks through the power supply section.

The above-mentioned battery-powered electrical apparatuses include, in addition to the mobile information apparatuses, for example, power tools such as power drills, power saws, and power mowers; household electric appliances such as flashlights, cordless cleaners, cordless irons, cordless telephones, electric razors, and electric toothbrushes; emergency appliances such as fire alarms, emergency lights, burglar alarms, and UPSs.

The above-mentioned battery management server, for example, automatically recognizes battery-powered electrical apparatuses on the network by the plug and play (PnP). At that time, the device list management section creates or updates the list (which is hereafter referred to as device list) of the battery-powered electrical apparatuses on the network.

The above-mentioned battery management server is preferably a personal computer (PC). Alternatively, the above-mentioned battery management server itself may be one of the battery-powered electrical apparatuses included in the device list. At that time, the battery management server is, more preferably, a mobile information apparatus.

The above-mentioned battery management server determines an optimization plan about each of the battery-powered electrical apparatuses included in the device list as follows.

PCs and mobile information apparatuses are generally equipped with a scheduler. In the above-mentioned battery management server, the schedule recording section functions by the scheduler. The schedule recording section records data on the user's schedule in a predetermined file format. Here, in the above-mentioned battery management server, the schedule recording section may record the schedules of more than one user. In particular, the schedule recording section may import through the above-mentioned network the files about the schedules of the users recorded by the schedulers of the PCs and the mobile information apparatuses that are different from the battery management server.

The charge-state optimization planning section first accesses the files recorded about the schedules of (generally more than one of) the user and the device list, and estimates the use schedules by the users of the battery-powered electrical apparatuses included in the device list. The use schedule includes, for example, the presence or absence of the connection to the external power supply, the frequency of battery-powered operation, the operating/standby time, the use objective, the power consumption. For example, when a user stays at the office or home for a long time, the charge-state optimization planning section may estimate "In that period, mobile information apparatuses such as notebook computers are connected to an external power supply (for example, a commercial AC power supply), and battery-powered household electric appliances such as electric razors are driven with a battery frequently or for a long time." When a user frequently goes out or travels for a long time in such cases as business trips, the charge-state optimization planning section may estimate "In that period, battery-powered household electric appliances such as electric razors are connected to an external power supply, and mobile information apparatuses such as notebook computers are driven with a battery frequently or for a long time." Alternatively, the charge-state optimization planning section may estimate "When battery-powered power tools such as power drills are aimed at the use as a hobby, for example, the tools are on standby with the connection to the external power supply every weekday, and the tools are driven with a battery frequently or for a long time on weekends or the user's vacation."

The charge-state optimization planning section next determines the charge states of control target for the battery-powered electrical apparatuses with respect to each period in which a connection to an external power supply is expected, according to the estimated use schedules of the apparatuses. Here, "the charge state of control target" is defined in a manner similar to the definition in the above explanation of the mobile information apparatus according to the present invention. The charge state of control target is optimized, for example, through the comparison between the continuous charging characteristic of the rechargeable battery in each of the battery-powered electrical apparatuses and the operable time or the electrical power to be secured at the time of the next battery-powered operation.

Thus, the charge-state optimization planning section determines the above-mentioned optimization plans with respect to the battery-powered electrical apparatuses on the network, and informs the battery-powered electrical apparatuses of the respective optimization plans.

In each of the battery-powered electrical apparatuses informed by the above-mentioned battery management server of the above-mentioned optimization plan, the power-supply control section determines the charge and discharge conditions based on the optimization plan. More specifically, the power-supply control section compares the charge state of control target with the real charge state with respect to the rechargeable battery, and establishes a discharge condition when the discharging is required and establishes a charge condition when the charging is required. The discharge condition stipulates, for example, the set value of the discharging current, the discharging duration, the discharge start/end time, the target value of the amount of discharge electricity, and the discharge end voltage. The charge condition stipulates, for example, the set value of the charging current, the charging duration, the charge start/end time, the target value of the amount of charge electricity, the charge end voltage/temperature, the control changeover voltage, and the charge end current. The power-supply control section controls the charge and discharge operations of the rechargeable battery by the power supply section according to the charge and discharge conditions, and realizes the charge state of control target.

Thus, for each of the battery-powered electrical apparatuses on the network, the charge state of the rechargeable battery is optimized, and thereby the maintenance of the long life of the rechargeable battery and the maximum use of the battery capacity are both achieved. A user can collectively manage the respective charge states of the battery-powered electrical apparatuses on the network, only by recording the user's own schedule with the scheduler of the above-mentioned battery management server. Accordingly, the user's control burden is reduced.

A charge-state optimization program of the battery management server according to the present invention causes the CPU in the above-mentioned battery management server according to the present invention to function as the above-mentioned schedule recording, device list management, and charge-state optimization planning sections. Thereby, the program allows a general server to function as the server according to the present invention.

One additional aspect of the invention is a method for optimizing a charge state of a battery in a battery-powered electrical apparatus by a battery management server. The method includes the steps of: (A) recording a user's schedule; (B) monitoring a connection to a network by the battery-powered electrical apparatus; (C) creating and updating a list of the battery-powered electrical apparatuses connected to the network; (D) for each of the battery-powered electrical apparatuses included in the list, determining a plan for the optimization of the charge state of a rechargeable battery in a battery storage section by the battery management server according to the schedule; (E) informing each of the battery-powered electrical apparatuses of the plan for the optimization by the battery management server through the network; (F) establishing charge and discharge conditions based on the plan for the optimization by each of the battery-powered electrical apparatuses; and (G) controlling the charge and discharge of the rechargeable battery by a power supply section on the charge and discharge conditions in each of the battery-powered electrical apparatuses. Here, "the charge state of the rechargeable battery," "the optimization plan" related, and "the charge and discharge conditions" are defined in a manner similar to the definition in the above explanation of the mobile information apparatus according to the present invention. Furthermore, "the network," "the battery-powered electrical apparatus," and "the battery management server" are similar to those in the above-mentioned battery management server according to the present invention.

In the step of recording a user's schedule, for example, the scheduler generally incorporated into the battery management server is used, and the schedules of generally more than one user are recorded. Alternatively, the schedulers incorporated into the PCs or the mobile information apparatuses on the network except for the battery management server may be used. At that time, files about the schedules of the users are uploaded into the battery management server through the network.

In the step of creating/updating the list of the battery-powered electrical apparatuses on the network, by the PnP, for example, the above-mentioned battery management server automatically recognizes the battery-powered electrical apparatuses on the network, and creates or updates the list, namely, the device list.

In the step of determining the above-mentioned optimization plans, the above-mentioned battery management server determines the above-mentioned optimization plans as follows. In the battery management server, first, the use schedules by, generally, more than one user of the battery-powered electrical apparatuses included in the device list are estimated based on the schedules of the users recorded and the device list. The use schedules include, for example, the presence or absence of the connection to the external power supply, the frequency of battery-powered operation, the operating/standby time, the use objective, and the amount of power consumption. The estimation of the use schedules is performed, for example, in a manner similar to the estimation by the above-mentioned battery management server according to the present invention. Next, for each of the battery-powered electrical apparatuses on the network, the charge states of control target are determined with respect to the periods in which a connection to an external power supply is expected, according to the estimated use schedules. Here, "the charge state of control target" is defined in a manner similar to the definition in the above explanation of the mobile information apparatus according to the present invention. The charge state of control target is optimized, for example, through the comparison between the continuous charging characteristic of the rechargeable battery in each of the battery-powered electrical apparatuses and the operable time or the electric power to be secured at the time of the next battery-powered operation. Thus, the above-mentioned optimization plan is determined with respect to each of the battery-powered electrical apparatuses on the network, and the battery management server informs the battery-powered electrical apparatuses of the respective optimization plans.

In each of the battery-powered electrical apparatuses informed by the above-mentioned battery management server of the above-mentioned optimization plan, the power-supply control section determines the charge and discharge conditions based on the optimization plan. More specifically, the power-supply control section compares the charge state of control target with the real charge state with respect to the rechargeable battery, and establishes a discharge condition when the discharging is required, and establishes a charge condition when the charging is required. The discharge condition stipulates, for example, the set value of the discharging current, the discharge duration, the discharge start/end time, the target value of the amount of discharge electricity, and the discharge end voltage. The charge condition stipulates, for example, the set value of the charging current, the charge duration, the charge start/end time, the target value of the amount of charge electricity, the charge end voltage/temperature, the control changeover voltage, and the charge end current. The power-supply control section controls the charge and discharge operations of the rechargeable battery by the power supply section according to the charge and discharge conditions, and realizes the charge state of control target. Thus, with respect to each of the battery-powered electrical apparatuses on the network, the charge state of the rechargeable battery is optimized, and thereby the maintenance of the long life of the rechargeable battery and the maximum use of the battery capacity are both achieved. A user can collectively manage each of the charge states of the battery-powered electrical apparatus on the network, only by recording the user's own schedule with the scheduler of the above-mentioned battery management server. Accordingly, the user's control burden is reduced.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The following explains the best embodiments of the present invention, referring to the figures.

<<Embodiment 1>>

Figure 1:
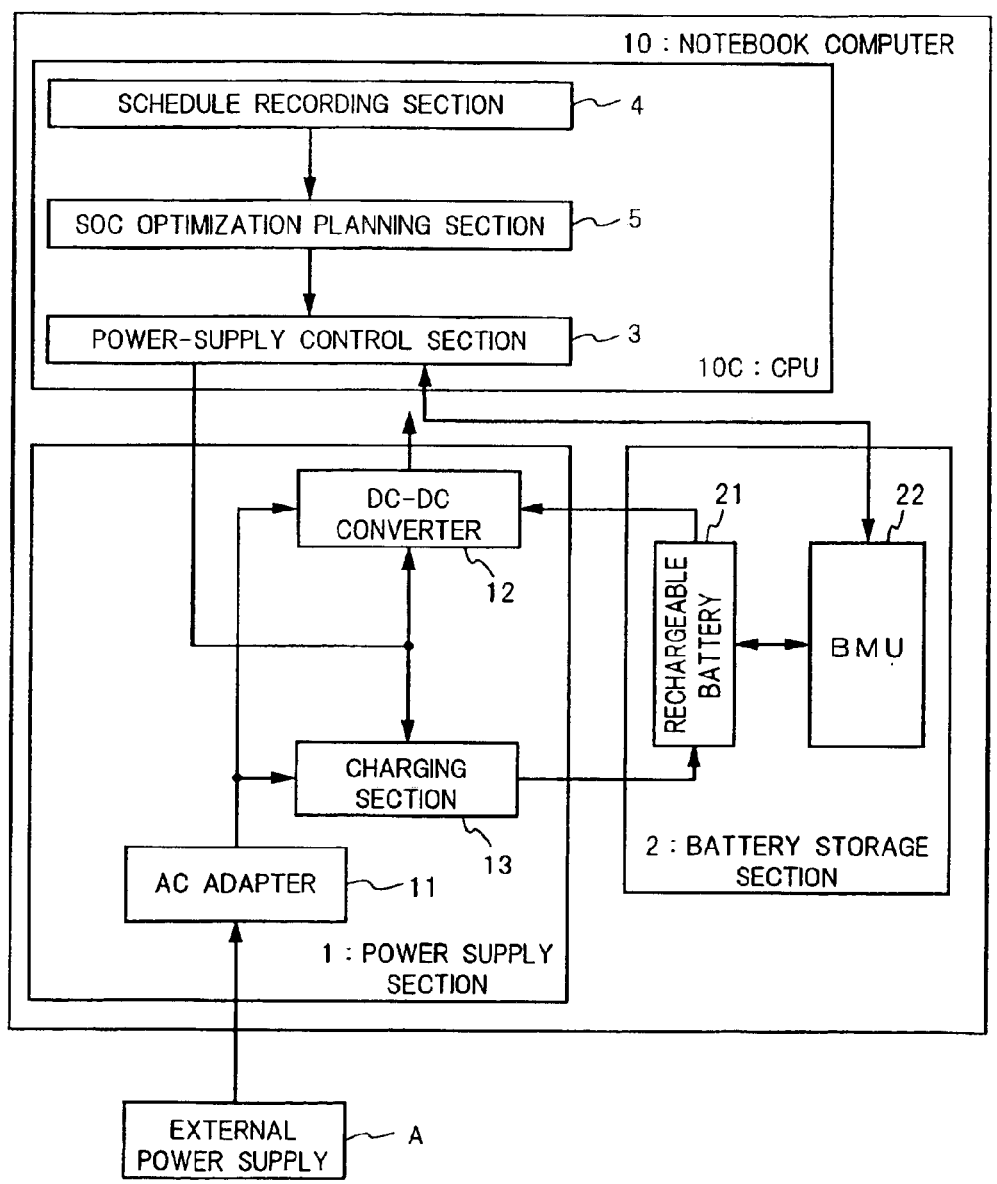
FIG. 1 is the block diagram about the battery management in a notebook computer 10 according to Embodiment 1 of the present invention.

FIG. 1 is the block diagram about the battery management in the notebook computer 10 according to Embodiment 1 of the present invention.

A power supply section 1 converts the electric power from the external power supply A or a rechargeable battery 21 in a battery storage section 2 into a predetermined DC power, and supplies the DC power to each section in the notebook computer 10. The power supply section 1 includes an AC adapter 11, a DC-DC converter 12, and a charging section 13. The AC adapter 11, when connected to the external AC power supply A, converts the AC power provided by the power supply A into a DC power, and sends out the DC power to the DC-DC converter 12 and the charging section 13. The DC-DC converter 12 receives the input of the DC power from the AC adapter 11 or the rechargeable battery 21, and produces the outputs of the predetermined DC voltages to the respective sections of the notebook computer 10. The charging section 13 charges the rechargeable battery 21 with the DC power from the AC adapter 11.

The battery storage section, namely, the battery pack 2 includes the rechargeable battery 21 and a battery management unit (BMU) 22, and is removable from the cabinet of the notebook computer 10. The rechargeable battery 21 is preferably a Li-ion rechargeable battery. The rechargeable battery 21 may be, alternatively, a NiCd storage battery or a NiH storage battery. The BMU 22 monitors the voltage, current, and temperature of the rechargeable battery 21. The BMU 22 further, using its built-in CPU, processes the information about the rechargeable battery 21 and performs data communications with the power-supply control sections 3. Here, the information about the rechargeable battery 21 includes the measured values of the voltage, current, and temperature, the remaining capacity, and the identifying information (for example, the type and rated capacity and voltage of the battery), with respect to the rechargeable battery 21. The remaining capacity of the rechargeable battery 21 is calculated by the BMU 22 based on the integral of the battery current or the relations between the battery voltage/temperature and the battery capacity (the charge and discharge characteristic). The power-supply control section 3 is then informed of the information about the rechargeable batteries 21.

The CPU (not shown) of the notebook computer 10 runs a program predetermined and recorded by, for example, a HDD (not shown) built into the notebook computer 10, thereby functioning as the power-supply control section 3. Particularly when the AC adapter 11 is connected to the external power supply A, the power-supply control section 3 controls the discharging and charging of the rechargeable battery 21 by the DC-DC converter 12 in the power supply section 1 and the charging section 13, respectively. Thereby, the power-supply control section 3 maintains the charge state (which is hereafter referred to as the SOC) of the rechargeable battery 21 at the predetermined control target value or within the predetermined range. More specifically, the power-supply control section 3 first compares the SOC shown by the notification from the BMU 22 with the control target value or the range. When the SOC exceeds the control target value or the range, the power-supply control section 3 establishes a discharge condition, and causes the rechargeable battery 21 to discharge an appropriate amount of electricity. On the other hand, when the SOC falls below the control target value or the range, the power-supply control section 3 establishes a charge condition, and causes the rechargeable battery 21 to charge an appropriate amount of electricity.

The power-supply control section 3 performs the constant-current control over the discharging of the rechargeable battery 21. At that time, the power-supply control section 3 stipulates as the discharge conditions, for example, the set value of the discharging current, the discharge duration, the discharge start/end time, the target amount of discharge electricity (the target integral of the discharging current), and the discharge end voltage. The BMU 22 monitors the discharging current and the battery voltage during the discharge period of the rechargeable battery 21. When the BMU 22 informs the power-supply control section 3 of the attainment of the target value by the amount of discharge electricity or the fall of the battery voltage to the discharge end voltage, the power-supply control section 3 stops the DC-DC converter 12, and thereby cuts off the discharging of the rechargeable battery 21. Thus, the rechargeable battery 21 discharges the predetermined amount of electricity.

When the rechargeable battery 21 is a Li-ion rechargeable battery, the power-supply control section 3 performs the constant-voltage and constant-current charge operation on the rechargeable battery 21. At that time, the power-supply control section 3 stipulates as the charge conditions, for example, the set value of the charging current, the charge duration, the charge start/end time, the target amount of charge electricity, the control changeover voltage, and the charge end current. In the constant-voltage and constant-current charge operation, the power-supply control section 3 first maintains the charging current constant, and the BMU 22 monitors the battery voltage. When the BMU 22 informs the power-supply control section 3 of the attainment of the control changeover voltage by the battery voltage, the power-supply control section 3 maintains the charge voltage constant, and the BMU 22 monitors the charging current. When the BMU 22 informs the power-supply control section 3 of the decline of the charging current to the charge end current, the power-supply control section 3 stops the charging section 13, and cuts off the charging of the rechargeable battery 21. Thus, the rechargeable battery 21 charges the predetermined amount of electricity. Here, the amount of charge electricity is adjusted using the control changeover voltage or the charge end current. For example, the reduction of the amount of charge electricity only requires setting the lower control changeover voltage and/or the larger charge end current.

The CPU (not shown) of the notebook computer 10 runs the scheduler recorded by, for example, the HDD (not shown) built into the notebook computer 10, and thereby functions as the schedule recording section 4. Here, the scheduler is an application to record and manage the user's schedule, and may be, for example, a scheduler incorporated into a general mobile information apparatus. The schedule recording section 4 records data on the user's schedule that the user enters through a keyboard or a mouse (not shown), into a nonvolatile memory such as the above-mentioned HDD and a memory card. Here, when more than one user shares the notebook computer 10, the schedule recording section 4 records the respective data on the schedules of the users.

The CPU (not shown) of the notebook computer 10 runs the predetermined program recorded by, for example, the HDD (not shown) built into the notebook computer 10, and thereby functions as the charge-state (SOC) optimization planning section 5. The SOC optimization planning section 5 determines a plan for an optimization of the SOC of the rechargeable battery 21 based on the user's schedule, and informs the power-supply control section 3 of the optimization plan. Here, the optimization plan is defined as the plan for the setting of the control target SOC of the rechargeable battery 21, and expressed, for example as the control target value or the range (which is hereafter referred to as the control target SOC) with respect to every period for which the setting of the SOC is planned.

The control target SOC of the rechargeable battery 21 set up with the optimization plan is optimized through, for example, the comparison of the continuous charging characteristic of the rechargeable battery 21 with the operable time or electric power to be secured at the time of the next battery-powered operation. For example, when the long operating time or the large power consumption is estimated for the next battery-powered operation, the control target SOC may be set at the full charge. On the other hand, when the AC adapter 11 maintains the connection to the external power supply A for a long time, the control target SOC may be set at the levels lower enough than the full charge, for the purpose of suppressing the deterioration of the rechargeable battery 21 due to the continuous charging.

Figure 2:
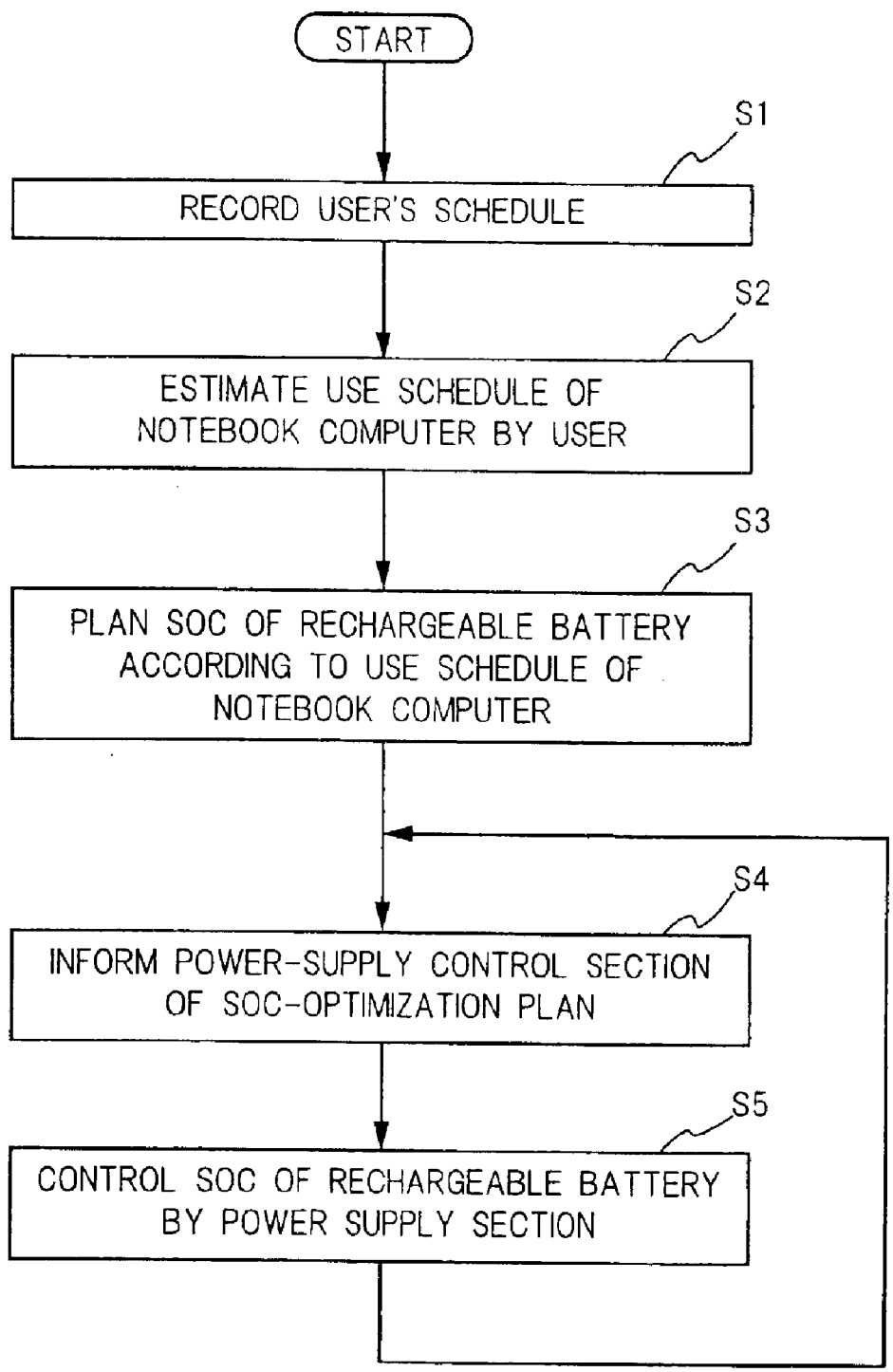
FIG. 2 is the flow chart showing, with respect to the notebook computer 10 according to Embodiment 1 of the present invention, the determination of the plan for an optimization of the SOC of the rechargeable battery 21 by the SOC optimization planning section 5, and the control over the SOC of the rechargeable battery 21 by the power-supply control section 3 based on the optimization plan.

More specifically, the determination of the plan for an optimization of the SOC of the rechargeable battery 21 by the SOC optimization planning section 5 and the control over the SOC of the rechargeable battery 21 by the power-supply control section 3 based on the optimization plan are performed as follows. FIG. 2 is the flow chart showing the determination of the above-mentioned optimization plan and the above-mentioned control over the SOC based on the optimization plan.

<Step S1>

A user enters the user's own schedule into the notebook computer 10 using the scheduler. The schedule recording section 4 records the received data on the user's schedule in a predetermined file format.

<Step S2>

The SOC optimization planning section 5 accesses the file about the user's schedule recorded by the schedule recording section 4. The SOC optimization planning section 5 further estimates the use schedule of the notebook computer 10 by the user, based on the user's schedule. The use schedule includes, for example, the presence or absence of the connection to the external power supply A through the AC adapter 11, the frequency of battery-powered operation, the operating/standby time, the use objective, and the power consumption.

Figure 3:
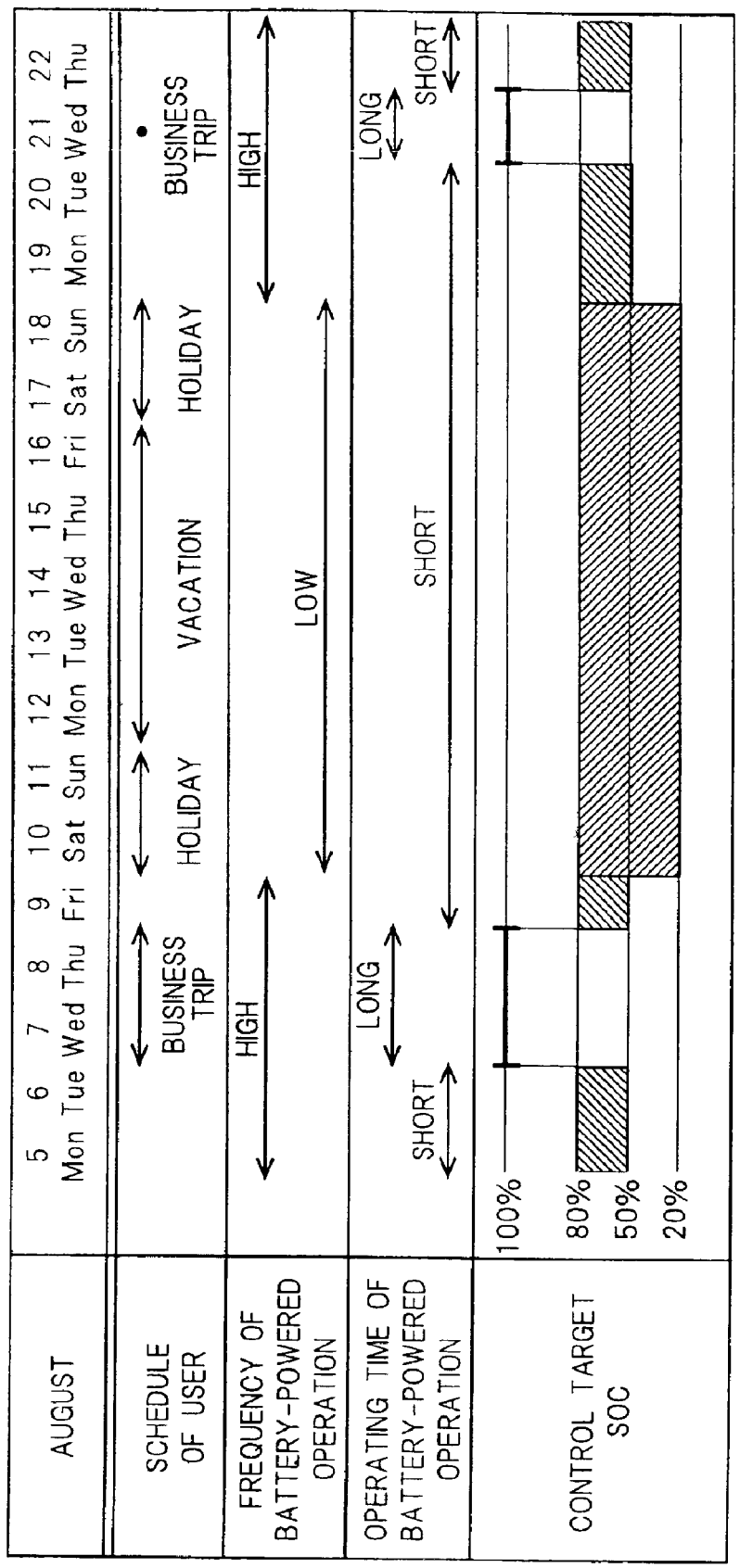
FIG. 3 is the table showing, with respect to the notebook computer 10 according to Embodiment 1 of the present invention, an example of the user's schedule recorded by the schedule recording section 4, a use schedule of the notebook computer 10 estimated by the SOC optimization planning section 5 based on the user's schedule, and control target SOC planned by the SOC optimization planning section 5 based on the use schedule.

FIG. 3 is the table showing an example of the user's schedule recorded by the schedule recording section 4, the use schedule of the notebook computer 10 estimated by the SOC optimization planning section 5 based on the user's schedule, and the control target SOC planned by the SOC optimization planning section 5 based on the use schedule. In FIG. 3, the first and second rows show the user's schedule during August 5–22. The third and fourth rows show the estimated use schedule of the notebook computer 10. The fifth row shows the plan for the control target SOC.

According to the user's schedule during August 5–22, business trips are scheduled for August 7–8 and 21, and a vacation is scheduled for August 12–16. Furthermore, August 10, 11, 17, and 18 are holidays. The SOC optimization planning section 5 estimates the use schedule of the notebook computer 10 by the user based on the user's schedule as follows. In the example shown in FIG. 3, the use schedule of the notebook computer 10 consists of the frequency and operating time of the battery-powered operation. Here, the frequency of the battery-powered operation is rated as either of the two levels, high/low, and the operating time of the battery-powered operation is rated as either of the two levels, long/short. Alternatively, each of the frequency and the operating time may be precisely rated as one of more than two levels.

When it is planned that the user brings the notebook computer 10 to the office or the place other than home and stays there for a long time in such cases as business trips, the SOC optimization planning section 5 estimates "In that period, the notebook computer 10 works on the battery with a high frequency and for a long time." On a weekday, the user has a high probability of using the notebook computer 10 with the connection to the external power supply in the office, and a high probability of using the notebook computer 10 under the battery-powered operation on the way to or from work. Accordingly, the SOC optimization planning section 5 estimates "On a weekday, the notebook computer 10 works on the battery with a high frequency but for a short period of time." The user has a high probability of leaving the notebook computer 10 at home on holiday and vacation. Accordingly, the SOC optimization planning section 5 estimates "In those periods, the notebook computer 10 works on the battery in a low frequency and for a short period of time."

When more than one user shares the notebook computer 10, the SOC optimization planning section 5 first estimates the use schedule of the notebook computer 10 by each of the users. Next, for the periods wherein the use schedules overlap each other, the SOC optimization planning section 5 chooses, for example, the highest frequency and longest operating time of the battery-powered operation among the use schedules. Thereby, the use schedule of the notebook computer 10 is unified.

<Step S3>

The SOC optimization planning section 5 plans the SOC of the rechargeable battery 21 according to the estimated use schedule of the notebook computer 10 as follows. In the example shown in FIG. 3, the control target SOC of the rechargeable battery 21 is separated into three varieties, the full charge (100%), and 50–80% and 20–80% of the fully charged battery capacity. When the frequency of the battery-powered operation is high and the operating time of the battery-powered operation is long, the control target SOC is set at the full charge (100%). Thereby, the battery capacity for the battery-powered operation is secured to the full. When the frequency of the battery-powered operation is high but the operating time of the battery-powered operation is short, the control target SOC is set in 50–80% of the fully charged battery capacity. Thereby, at least 50% of the fully charged battery capacity is secured for the battery-powered operation, and the SOC during the period of the connection to the external power supply reduces more than 20% of the full charge. When the frequency of the battery-powered operation is low and the operating time of the battery-powered operation is short, the control target SOC is set in 20–80% of the fully charged battery capacity. Thereby, a charge operation for the rechargeable battery 21 does not start until the rechargeable battery 21 discharges deeply to such a degree that the SOC falls below the lower limit (20%) of the control target. Furthermore, the charge operation is performed only to, at most, 80% of the fully charged battery capacity. Thus, the SOC during the period of the connection to the external power supply is maintained lower enough than the full charge.

<Step S4>

The SOC optimization planning section 5 informs the power-supply control section 3 of the SOC planned as the control target. At that time, the SOC optimization planning section 5 informs the power-supply control section 3 of the combination of the control target SOC and the information about the period during which each of the control target SOC should be realized, as the plan for the optimization of the SOC. Here, the notice may be performed regularly. Alternatively, the notice may be performed at a constant time before every time when the control target SOC changes.

<Step S5>

The power-supply control section 3 sets the charge and discharge conditions for the rechargeable battery 21 according to the optimization plan of which the SOC optimization planning section 5 informs the power-supply control section 3, and controls the charge and discharge operations of the rechargeable battery 21 by the power supply section 1. Thereby, the power-supply control section 3 realizes the control target SOC according to the optimization plan. For example, a control over the SOC for the rechargeable battery 21 is performed, according to the optimization plan shown in FIG. 3, as follows.

(August 5–6)

The control target SOC is set within 50–80% of the fully charged battery capacity. The power-supply control section 3 monitors the SOC of the rechargeable battery 21 by the BMU 22 in the battery storage section 2. For example, when the SOC falls below 50% of the fully charged battery capacity because of the battery-powered operation or the self-discharge, the BMU 22 informs the power supply control section 3 of the fall. Then, the power-supply control section 3 establishes a charge condition, and charges the rechargeable battery 21 by the charging section 11 in the power supply section 1. Here, the charge condition is established so that the SOC does not exceed 80% of the fully charged battery capacity. Thus, the SOC is maintained within the control target range.

(August 7–8)

The control target SOC is set at the full charge (100%). The power-supply control section 3 predicts the duration of the period required to raise the SOC from 50–80% of the fully charged battery capacity to the full charge, before the period. The power-supply control section 3 further sets a charge condition that includes the charge start time, based on the predicted duration. Thereby, the SOC has already been maintained at the full charge at the start time of the period.

(August 9)

The control target SOC is set within 50–80% of the fully charged battery capacity. At the beginning of this period, the power-supply control section 3 measures the SOC of the rechargeable battery 21 through the BMU 22. The power-supply control section 3 further establishes the charge and discharge conditions based on the deviation of the SOC measured from the control target SOC, and causes the SOC to fall within the control target range.

(August 10–18)

The control target SOC is set within 20–80% of the fully charged battery capacity. At the beginning of the period, the power-supply control section 3 measures the SOC of the rechargeable battery 21 through the BMU 22. The power-supply control section 3 further establishes the charge and discharge conditions based on the deviation of the SOC measured from the control target SOC, and causes the SOC to fall within the control target range. In this period, the SOC is maintained lower enough than the full charge since the lower limit of the control target SOC is particularly low.

On and after August 19, the SOC is similarly controlled according to the optimization plan.

As described above, the notebook computer 10 according to Embodiment 1 determines the plan for the optimization of the SOC of the rechargeable battery 21 based on the user's schedule. In the optimization plan, especially, the SOC is maintained at the full charge only in the proximity of the period during which the long-duration battery-powered operation of the notebook computer 10 is scheduled. On the other hand, the SOC is maintained lower than the full charge over the long duration of the connection to the external power supply, and then the deterioration due to the continuous charge is suppressed. Thereby, the maintenance of the long life of the rechargeable battery 21 and the maximum use of the battery capacity are both realized.

In the control over the SOC with the notebook computer 10 according to Embodiment 1, the user has only to enter the user's own schedule with the scheduler. Accordingly, the burden on the user for the control over the SOC is lighter than the conventional apparatuses.

<<Embodiment2>>

Figure 4:
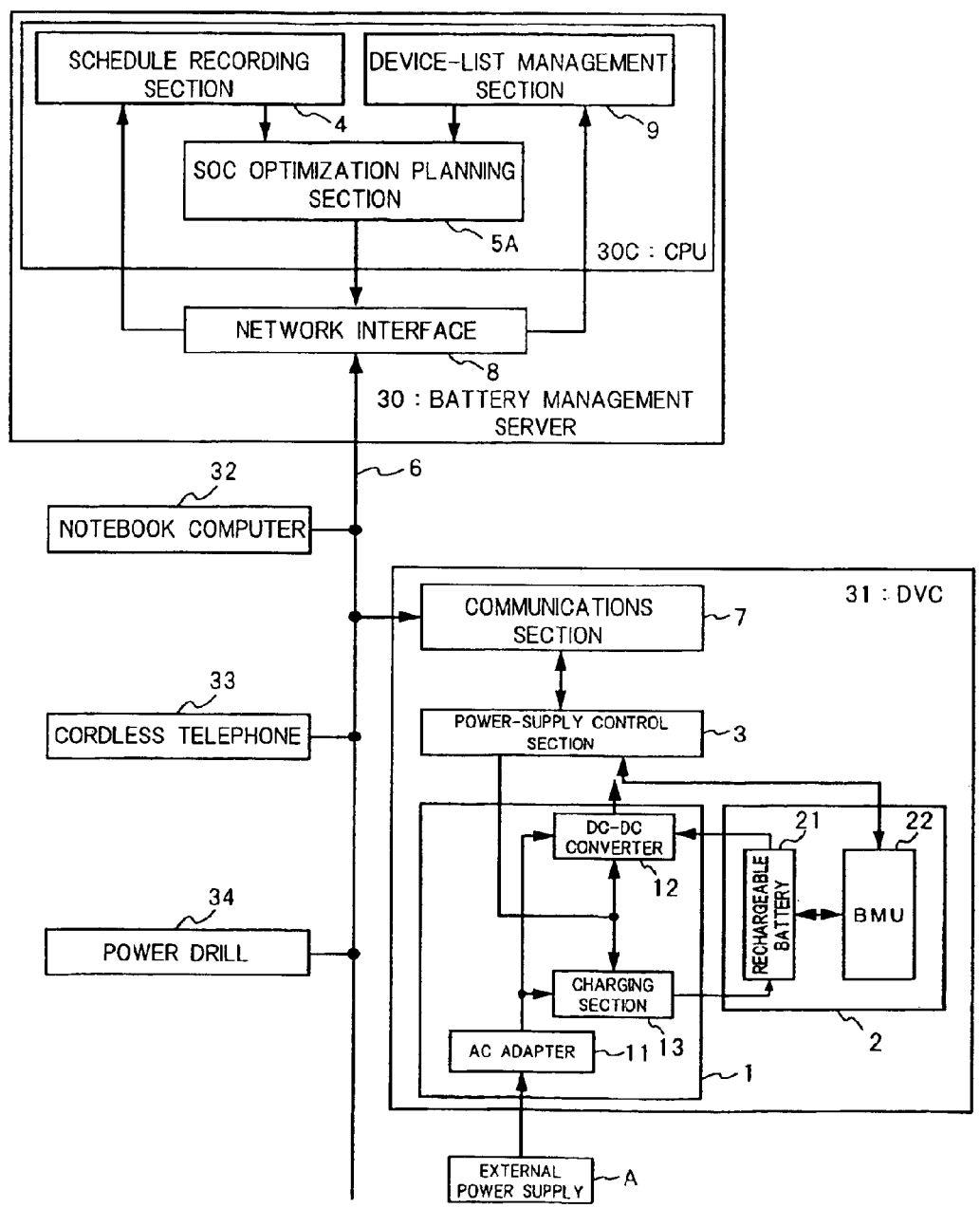
FIG. 4 is the block diagram about the battery management by a battery management server 30 according to Embodiment 2 of the present invention, with respect to the battery-powered electrical apparatuses 31, 32, 33, 34, . . . , on a network 6.

FIG. 4 is the block diagram about the battery management by a battery management server 30 according to Embodiment 2 of the present invention with respect to battery-powered electrical apparatuses 31, 32, 33, 34, . . . , on a network 6. In FIG. 4, components similar to components of the notebook computer 10 according to Embodiment 1 of the present invention are marked with the same reference symbols as ones shown in FIG. 1. Furthermore, as for those similar components, the explanation in Embodiment 1 is cited.

The network 6 is preferably an IP network, and particularly a network based on IEEE 802.3. The network 6 may alternatively be a network based on wireless LAN (IEEE 802.11), USB, or IEEE 1394. The network 6 may further be a network using power lines according to PLC.

For example, a DVC 31, a notebook computer 32, and a cordless telephone 33, and a power drill 34 are connected to the network 6 as clients in addition to the battery management server 30. All of them are battery-powered electrical apparatuses, and include similar components with respect to the connection system to the network 6 and the power supply system. For example, the DVC 31 comprises a power supply section 1, a battery storage section 2, and a power-supply control section 3. Since all of them are similar to the components of the notebook computer 10 according to Embodiment 1, the explanation in Embodiment 1 is cited for details of those components. The DVC 31 has, in addition, a communications section 8, thereby performing data communications with the networks 6. The communications section 7, particularly when connected to the network 6, realizes PnP between the battery management servers 30. The power-supply control section 3 sends out, for example, information about the rechargeable battery 21 of which the BMU 22 informs the power-supply control section 3, (for example, the measured values of the voltage, current, and temperature, the remaining capacity, and identifying information of the rechargeable battery 21) through the communications section 7 to the battery management server 30. On the other hand, the power-supply control section 3 receives the data showing the plan for the optimization of the SOC of the rechargeable battery 21 from the battery management server 30.

The battery management server 30 according to Embodiment 2 is a PC preferably. The server may be particularly a notebook computer or a PDA. A network interface 8 performs data communications with the network 6.

The CPU (not shown) of the battery management server 30 runs the scheduler recorded by, for example, a HDD (not shown) built in the battery management server 30, and functions as a schedule recording section 4. Here, the scheduler is the application for recording and managing a user's schedule, and may be, for example, a scheduler incorporated into a general PC. The schedule recording section 4 records data on the user's schedule that the user enters through a keyboard or a mouse (not shown), in a nonvolatile memory such as the above-mentioned HDD and a memory card, in a predetermined file format. The schedule recording section 4 may, in addition, import the files about the user's schedule through the network 6 from other mobile information apparatuses on the network 6, for example, the notebook computer 32. At that time, there may exist more than one user. In other words, the schedule recording section 4 generally records the files about the schedules of more than one user.

The CPU (not shown) of the battery management server 30 runs a predetermined program recorded by, for example, the HDD (not shown) built in the battery management server 30, and functions as a device-list management section 9. The device-list management section 9 monitors connections of the battery-powered electrical apparatuses to the network 6 through the network interface 8. Using PnP, the battery management server 30 automatically recognizes the battery-powered electrical apparatuses newly connected to the network 6. Then, the device-list management section 9 identifies the battery-powered electrical apparatuses and updates the list (device list) of the battery-powered electrical apparatuses on the network 6.

The CPU (not shown) of the battery management server 30 runs a predetermined program recorded by, for example, the HDD (not shown) built in the battery management server 30, and functions as a SOC optimization planning section 5A. The SOC optimization planning section 5A, with respect to each of the battery-powered electrical apparatuses included in the device list, determines a plan for an optimization of the SOC of the rechargeable battery based on the user's schedule. The SOC optimization planning section 5A further informs, through the network 6, the power-supply control section in the battery-powered electrical apparatus of the data showing the correspondingly determined optimization plan.

Figure 5:
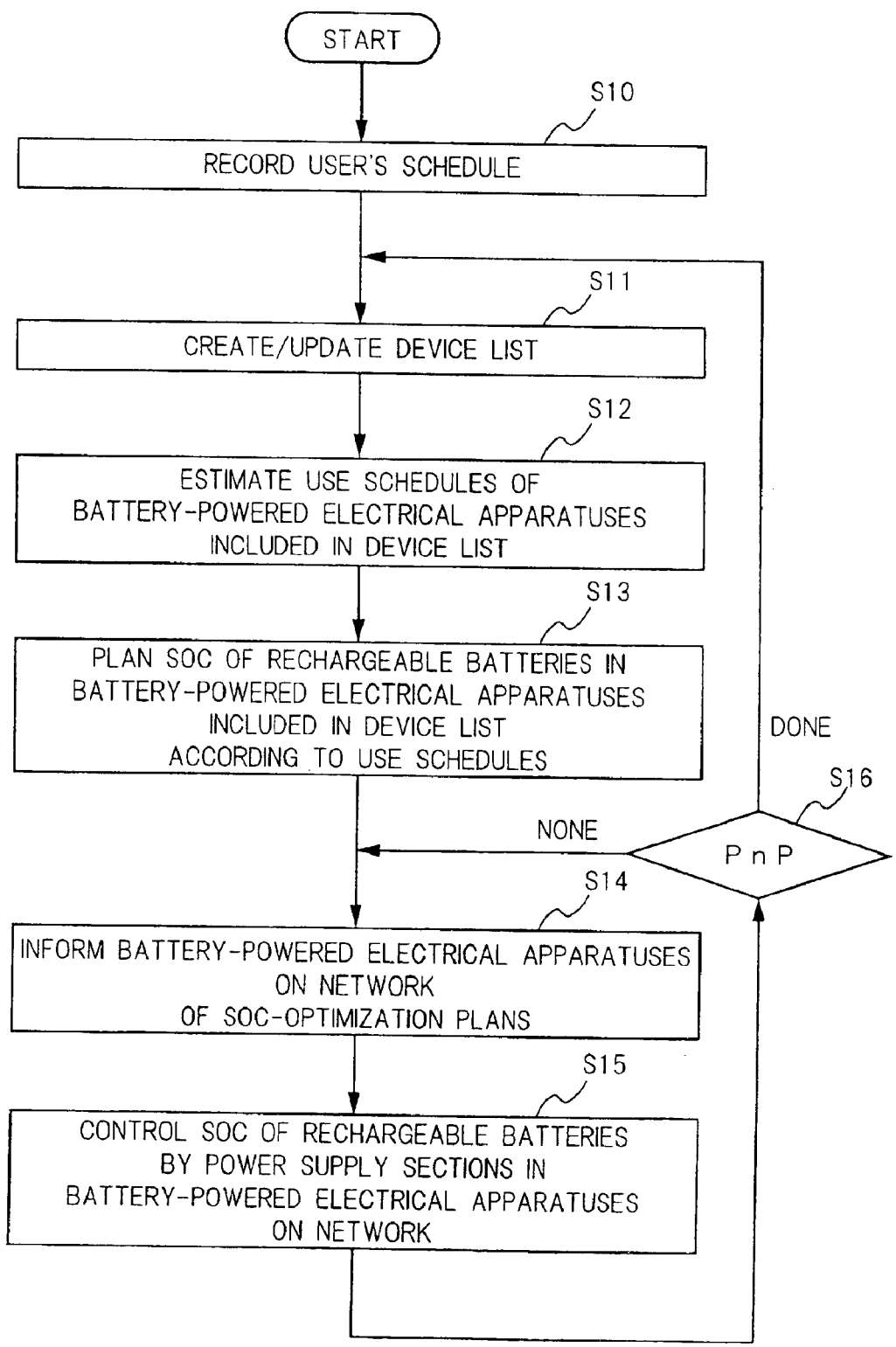
FIG. 5 is the flow chart showing, with respect to the battery management server 30 according to Embodiment 2 of the present invention, the determination of the plan for an optimization of the SOC of the rechargeable battery by the SOC optimization planning section 5A, the control over the SOC of the rechargeable battery by each of the battery-powered electrical apparatuses on the network 6 based on the optimization plans.

More specifically, the determination of the plan for the optimization of the SOC of the rechargeable battery by the SOC optimization planning section 5A in the battery management server 30, and the control over the SOC of the rechargeable battery in each of the battery-powered electrical apparatuses on the network 6 based on the optimization plan, are performed as follows. FIG. 5 is the flow chart showing the above-mentioned determination of the optimization plan and the above-mentioned control over the SOC based on the optimization plan.

<Step S10>

A user enters a user's own schedule directly to the battery management server 30 using, for example, the scheduler of the battery management server 30. The schedule recording section 4 records the input data on the user's schedule in a predetermined file format. The user may enter the user's own schedule, alternatively, with the schedulers of other PCs or mobile information apparatuses on the network 6, for example, the notebook computer 32. At that time, files on the schedules are uploaded to the battery management server 30 through the network 6.

<Step S11>

The device-list management section 9 creates or updates the device list. In the example shown in FIG. 4, the device list includes the DVC 31, the notebook computer 32, the cordless telephone 33, and the power drill 34.

<Step S12>

The SOC optimization planning section 5A accesses files on the schedules of (generally, more than) one user recorded by the schedule recording section 4 and the device list. The SOC optimization planning section 5A further estimates, based on the schedules of the users, a use schedule by the users with respect to each of the battery-powered electrical apparatuses included in the device list. The use schedule includes, for example, the presence or absence of the connection to the external power supply A through the AC adapter 11, the frequency of battery-powered operation, the operating/standby time, the use objective, and the power consumption.

Figure 6:
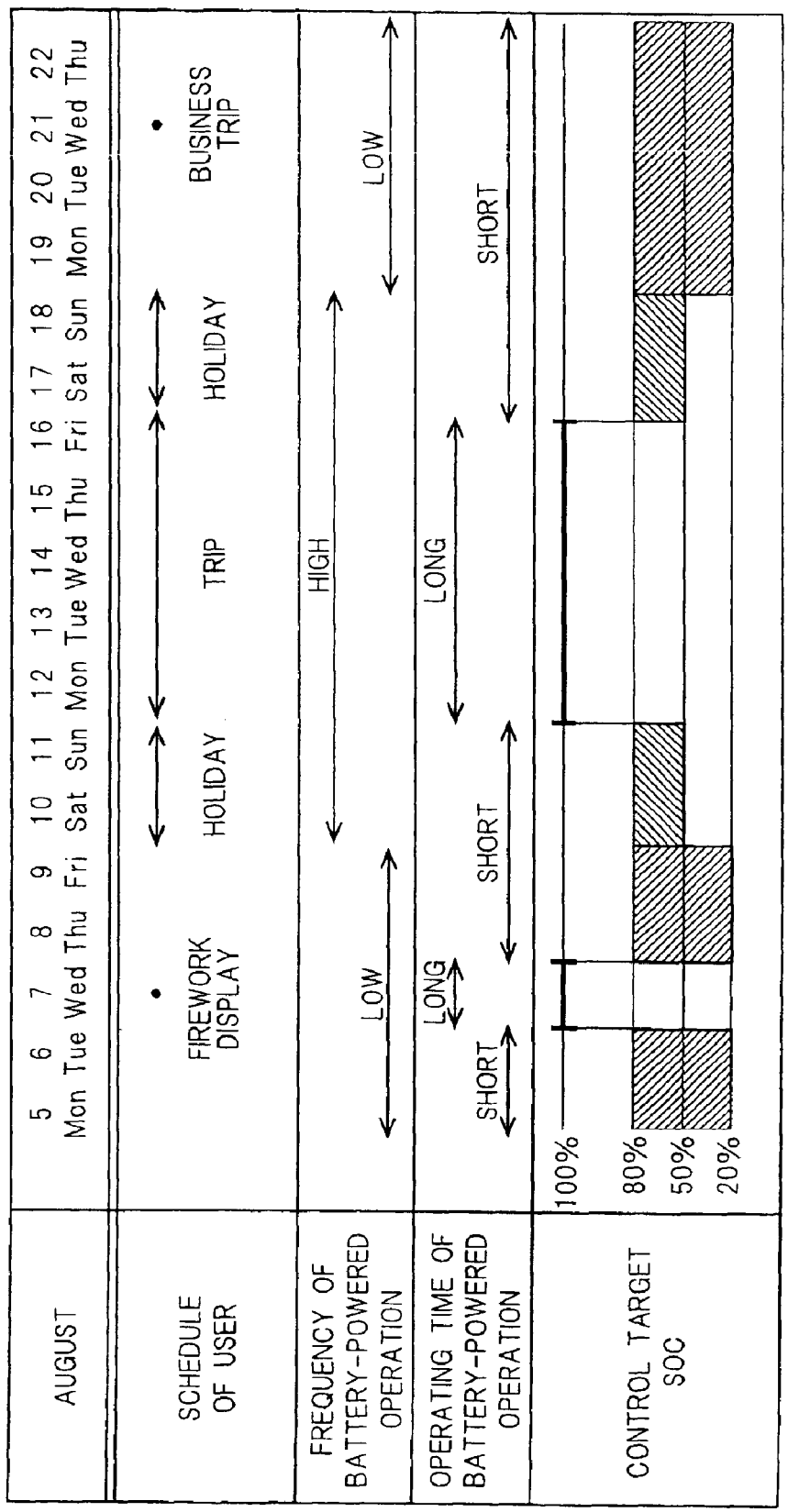
FIG. 6 is the table showing, with respect to the battery management server 30 according to Embodiment 2 of the present invention, an example of the user's schedule recorded by the schedule recording section 4, a use schedule of DVC 31 estimated by the SOC optimization planning section 5A based on the user's schedule, and control target SOC planned by the SOC optimization planning section 5A based on the use schedule.

FIG. 6 is the table showing an example of the user's schedule recorded by the schedule recording section 4, a use schedule of the DVC 31 estimated by the SOC optimization planning section 5A based on the user's schedule, and control target SOC planned by the SOC optimization planning section 5A based on the use schedule. In FIG. 6, the first and second rows show the user's schedule for August 5–22. The third and fourth rows show the estimated use schedule of the DVC 31. The fifth row shows the plan for the control target SOC. According to the user's schedule for August 5–22, a viewing of a firework display is scheduled on August 7 and a trip is scheduled on August 12–16. Furthermore, August 10, 11, 17, and 18 are holidays. The SOC optimization planning section 5A estimates the use schedule of the DVC 31 by this user based on this schedule as follows. Here, it is assumed "The use of the DVC 31 by this user aims at private enjoyment, not business." In the example shown in FIG. 6, the use schedule of the DVC 31 consists of the frequency and operating time of the battery-powered operation. Here, the frequency of the battery-powered operation is rated as either of the two levels, high/low, and the operating time of the battery-powered operation is rated as either of the two levels, long/short. Alternatively, each of the frequency and the operating time may be precisely rated as one of more than two levels.

On a weekday, the user has a high probability of leaving the DVC 31 at the user's home since the user is on duty. Accordingly, the SOC optimization planning section 5A estimates "On a weekday, the DVC 31 works on the battery with a low frequency and for a short period of time." The SOC optimization planning section 5A estimates "In the period during which leisure time amusements such as trips are scheduled, the DVC 31 works on the battery with a high frequency and for a long time." The SOC optimization planning section 5A estimates "In the period during which a few-hours entertainment such as a firework display is scheduled, the DVC 31 works on the battery with a low frequency but for a long time." The SOC optimization planning section 5A estimates "In a leisure period such as a holiday when no leisure time amusements and so on are scheduled, the DVC 31 works on the battery with a high frequency but for a short period of time."

When the battery management server 30 records the schedules of more than one user, the SOC optimization planning section 5A first estimates the use schedule of the DVC 31 by each of the users. Next, with respect to periods wherein the use schedules overlap each other, the SOC optimization planning section 5A chooses, for example, the highest frequency and longest operating time of the battery-powered operation among the use schedules. Thereby, the use schedule of the DVC 31 is unified.

The SOC optimization planning section 5A performs estimation similar to the above-mentioned estimation of the use schedule of the DVC 31, with respect to the use schedule of each of the other battery-powered electrical apparatuses included in the device list, that is, the notebook computer 32, the cordless telephone 33, and the power drill 34. At that time, the contents of the use schedule, such as the number of the levels and estimation criteria of the frequency and operating time of battery-powered operation, may vary among the battery-powered electrical apparatuses.

With respect to each of the battery-powered electrical apparatuses included in the device list, the SOC optimization planning section 5A plans the SOC of the rechargeable battery according to the estimated use schedule. With respect to the DVC31, for example, the SOC optimization planning section 5A plans the SOC of the rechargeable battery 21 according to the use schedule estimated as described above, as follows. In the example shown in FIG. 6, the control target SOC of the rechargeable battery 21 is separated into three varieties, the full charge (100%), and 50–80% and 20–80% of the fully charged battery capacity. When the operating time of the battery-powered operation is long, the control target SOC is set at the full charge (100%) regardless of the frequency of the battery-powered operation. Thereby, the battery capacity for the battery-powered operation is secured to the full. When the operating time of the battery-powered operation is short but the frequency of the battery-powered operation is high, the control target SOC is set within 50–80% of the fully charged battery capacity. Thereby, at least 50% of the fully charged battery capacity is secured for the battery-powered operation, and the SOC during the period of the connection to the external power supply reduces more than 20% of the full charge. When the operating time of the battery-powered operation is short and the frequency of the battery-powered operations is low, the control target SOC is set within 20–80% of the fully charged battery capacity. Thereby, a charge operation for the rechargeable battery 21 does not start until the rechargeable battery 21 discharges deeply to such a degree that the SOC falls below the lower limit (20%) of the control target. The charge operation is further performed only to, at most, 80% of the fully charged battery capacity. Thus, the SOC during the period of the connection to the external power supply is maintained lower enough than the full charge.

With respect to each of the other battery-powered electrical apparatus included in the device list (the notebook computer 32, the cordless telephone 33, and the power drill 34), the SOC optimization planning section 5A plans the SOC of the rechargeable battery in a manner similar to the planning for the SOC of the DVC 31. At that time, the contents of the plan such as the type of the control target SOC, may vary among the battery-powered electrical apparatuses.

<Step S14>

The SOC optimization planning section 5A informs the power-supply control section in each of the battery-powered electrical apparatuses included in the device list, of the SOC planned as a control target. At that time, the SOC optimization planning section 5A informs the power-supply control section of the combination of the control target SOC and the information about the period during which each of the control target SOC should be realized, as the plan for the optimization of the SOC. Here, the notice may be performed regularly. Alternatively, the notice may be performed at a constant time before every time when the control target SOC changes.

<Step S15>

In each of the battery-powered electrical apparatuses included in the device list, the power-supply control section sets the charge and discharge conditions for the rechargeable battery according to the optimization plan of which the SOC optimization planning section 5A informs the power-supply control section, and controls the charge and discharge operations of the rechargeable battery by the power supply section. Thereby, the power-supply control section realizes the control target SOC according to the optimization plan. For example, the control over the SOC for the rechargeable battery 21 is performed according to the optimization plan with respect to the DVC 31 shown in FIG. 6, as follows.

(August 5–6)

The control target SOC is set within 20–80% of the fully charged battery capacity. The power-supply control section 3 monitors the SOC of the rechargeable battery 21 using the BMU 22 in the battery storage section 2. When the SOC falls below 20% of the fully charged battery capacity because of the battery-powered operation or the self-discharge, for example, the BMU 22 informs the power-supply control section 3 of the fall. At that time, the power-supply control section 3 establishes a charge condition, and charges the rechargeable battery 21 by the charging section 11 in the power supply section 1. Here, the charge condition is established so that the SOC does not exceed 80% of the fully charged battery capacity. Thus, the SOC is maintained within the control target range.

(August 7)

The control target SOC is set at the full charge (100%). The power-supply control section 3 predicts the duration of the period required to raise the SOC from 20–80% of the fully charged battery capacity to the full charge, before this period. The power-supply control section 3 further establishes a charge condition including the charging start time based on the predicted time. Thereby, the SOC has already been maintained at the full charge at the start time of the period.

(August 8–9)

The control target SOC is set within 20–80% of the fully charged battery capacity. The power-supply control section 3 measures the SOC of the rechargeable battery 21 through the BMU 22 at the beginning of the period. The power-supply control section 3 establishes charge and discharge conditions based on the deviation of the SOC measured from the control target SOC, and causes the SOC to fall within the control target range. The SOC is maintained lower enough than the full charge in this period since the lower limit of the control target SOC is particularly low.

(August 10–11)

The control target SOC is set within 50–80% of the fully charged battery capacity. The power-supply control section 3 measures the SOC of the rechargeable battery 21 through the BMU 22 at the beginning of this period. The power-supply control section 3 further establishes charge and discharge conditions based on the deviation of the SOC measured from the control target SOC, and causes the SOC to fall within the control target range.

(August 12–16)

The control target SOC is set at the full charge (100%). The power-supply control section 3 predicts the duration of the period required to raise the SOC from 50–80% of the fully charged battery capacity to the full charge, before this period. The power-supply control section 3 further establishes a charge condition including the charging start time based on the predicted time. Thereby, the SOC has already been maintained at the full charge at the start time of the period.

On and after August 17, the SOC is controlled according to the optimization plan in the similar manner.

<Step S16>

The device-list management section 9 monitors the connection of the battery-powered electrical apparatuses to the network 6 through the network interface 8. Until a new battery-powered electrical apparatus is connected to the network 6, the control over the SOC according to Steps S14 and S15 repeats. When the battery management server 30 automatically recognizes the battery-powered electrical apparatus newly connected to the network 6, using PnP, the process returns to Step S11. The device-list management section 9 identifies the newly recognized, battery-powered electrical apparatus, and updates the device list. Furthermore, the plan for the optimization of the SOC is reset based on the updated device list.

As described above, the battery management server 30 according to Embodiment 2 determines the plan for the optimization of the SOC of the rechargeable battery based on the schedule of (generally, more than) one user, with respect to each of the battery-powered electrical apparatuses included in the device list. According to the optimization plan, especially, the SOC is controlled at the full charge only in the proximity of the period during which the long-duration battery-powered operation of the battery-powered electrical apparatus is scheduled. On the other hand, over the period during which a connection to an external power supply is maintained, the SOC is maintained lower than the full charge, and deterioration due to the continuous charge is suppressed. Thereby, the maintenance of the long life of the rechargeable battery and the maximum use of the battery capacity are both realized with respect to each of the battery-powered electrical apparatuses.

The DVC 31, the notebook computer 32, the cordless telephone 33, and the power drill 34 are connected to the network 6 according to Embodiment 2 as clients. In addition, mobile information apparatuses such as PDAs, cellular phones, and portable AV players; power tools such as power saws and power mowers; household electric appliances such as flashlights, cordless cleaners, cordless irons, electric razors, and electric toothbrushes; and emergency appliances such as fire alarms, emergency lights, burglar alarms, and UPSs; may be connected to the network 6.

With respect to more than one of the battery-powered electrical apparatuses on the network 6, the battery management server 30 according to Embodiment 2 collectively manages the SOC of the respective rechargeable batteries. Furthermore, in the control over the SOC, a user has only to enter the user's own schedule into the battery management server 30 using the scheduler. Accordingly, the user's control burden is reduced remarkably.

The mobile information apparatus according to the present invention determines the plan for optimization of the charge state of the rechargeable battery based on the user's schedule. According to the optimization plan, especially, the charge state of the rechargeable battery is maintained at the full charge only in the proximity of the period during which a long-duration battery-powered operation is scheduled. On the other hand, over the long duration of the connection to the external power supply, the charge state is maintained lower than the full charge, and deterioration due to the continuous charge is suppressed. Thereby, the maintenance of the long life of the rechargeable battery and the maximum use of the battery capacity are both realized.

Using the mobile information apparatus according to the present invention, the user has only to enter the user's schedule by the scheduler for the control over the charge state of the rechargeable battery. Accordingly, a burden on the user for the control is lighter than the conventional apparatus.

The battery management server according to the present invention automatically recognizes and lists more than one of the battery-powered electrical apparatuses connected to the network. With respect to each of the battery-powered electrical apparatuses included in the list, the battery management server further determines the plan for the optimization of the charge state of the rechargeable battery, based on the schedules of generally, more than one user. According to the optimization plan, especially, the charge state of the rechargeable battery is controlled at the full charge only in the proximity of the period during which the long-duration battery-powered operation of each of the battery-powered electrical apparatuses is scheduled. On the other hand, over the long duration of the connection to the external power supply, the charge state is maintained lower than the full charge, and deterioration due to the continuous charge is suppressed. Thereby, the maintenance of the long life of the rechargeable battery and the maximum use of the battery capacity are both realized with respect to each of the battery-powered electrical apparatuses.

The battery management server according to the present invention collectively manages the charge states of the rechargeable batteries with respect to more than one of the battery-powered electrical apparatuses on the network. Furthermore, for the control, a user has only to enter the user's own schedule into the battery management server using the scheduler. Accordingly, a burden on the user for the control is reduced remarkably.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

What is claimed is:

1. A mobile information apparatus (10) comprising:

(A) a battery storage section (2) including a rechargeable battery (21);

(B) a power supply section (1) for converting electric power provided by one of an external power supply (A) and said rechargeable battery (21) to direct current power, and charging said rechargeable battery (21) with electric power provided by said external power supply (A);

(C) a schedule recording section (4) for recording a user's schedule;

(D) a charge-state optimization planning section (5) for determining a plan for the optimization of the charge state of said rechargeable battery (21) according to said schedule; and (E) a power-supply control section (3) for establishing charge and discharge conditions based on said plan for the optimization, and, on the charge and discharge conditions, controlling the charge and discharge of said rechargeable battery (21) by said power supply section (1).

2. A method for optimizing the charge state of a battery in a mobile information apparatus (10), comprising the steps of:

(A) (S1) recording a user's schedule;

(B) (S2+S3) determining a plan for the optimization of the charge state of a rechargeable battery (21) in a battery storage section (2) according to said schedule;

(C) (S4) establishing charge and discharge conditions based on said plan for the optimization; and (D) (S5) controlling the charge and discharge of said rechargeable battery (21) by a power supply section (1) on said charge and discharge conditions.

3. The mobile information apparatus according to claim 1 further comprising a charge-state optimization program for causing a CPU of the mobile information apparatus (10) to function as said schedule recording section (4), said charge-state optimization planning section (5), and said power-supply control section (3).

4. A battery management server (30) for providing a plan for an optimization of the charge state of a battery in a battery-powered electrical apparatus (31, 32, 33, and 34), said apparatus (31, 32, 33, and 34) comprising:

(a) a communications section (7) for performing data communications with a network (6) of the outside;

(b) a battery storage section (2) including a rechargeable battery (21);

(c) a power supply section (1) for converting electric power provided by one of an external power supply (A) and said rechargeable battery (21) to direct current power, and charging said rechargeable battery (21) by the electric power provided by said external power supply (A); and (d) a power-supply control section (3) for establishing charge and discharge conditions based on the plan for the optimization of the charge state of said rechargeable battery (21), and, on the charge and discharge conditions, controlling the charge and discharge of said rechargeable battery (21) by said power supply section (1);

said server (30) comprising:

(A) a network interface (8) for performing data communications with said network (6);

(B) a schedule recording section (4) for recording a user's schedule;

(C) a device-list management section (9) for monitoring a connection to said network (6) by said battery-powered electrical apparatus (31, 32, 33, and 34), and creating and updating a list of said battery-powered electrical apparatuses (31, 32, 33, and 34) connected to said network (6); and (D) a charge-state optimization planning section (5A) for determining said plan for the optimization about each of said battery-powered electrical apparatuses (31, 32, 33, and 34) included in said list, and informing each of said battery-powered electrical apparatuses (31, 32, 33, and 34) of the plan for the optimization.

5. A method for optimizing a charge state of a battery in a battery-powered electrical apparatus (31, 32, 33, and 34) by a battery management server (30), comprising the steps of:

(A) (S10) recording a user's schedule;

(B) (S16) monitoring a connection to a network (6) by said battery-powered electrical apparatus (31, 32, 33 and 34);

(C) (S11) creating and updating a list of said battery-powered electrical apparatuses (31, 32, 33, and 34) connected to said network (6);

(D) (S12+S13) for each of said battery-powered electrical apparatuses (31, 32, 33, and 34) included in said list, determining a plan for the optimization of the charge state of a rechargeable battery (21) in a battery storage section (2) by said battery management server (30) according to said schedule;

(E) (S14) informing each of said battery-powered electrical apparatuses (31, 32, 33, and 34) of said plan for the optimization by said battery management server (30) through said network (6);

(F) (S15) establishing charge and discharge conditions based on said plan for the optimization by each of said battery-powered electrical apparatuses (31, 32, 33, and 34); and (G) (S15) controlling the charge and discharge of said rechargeable battery (21) by a power supply section (1) on said charge and discharge conditions in each of said battery-powered electrical apparatuses (31, 32, 33 and 34).

6. The battery management server (30) according to claim 4, further comprising a charge-state optimization program for causing a CPU of the battery management server (30) to function as said schedule recording section (4), said device-list management section (9), and said charge-state optimization planning section (5A).

* * * * *